United States Patent [19]

Inoue et al.

[11] Patent Number: 5,701,214
[45] Date of Patent: Dec. 23, 1997

[54] TAPE LOADING DEVICE IN MAGNETIC RECORDING/PLAYBACK APPARATUS THAT CONTROLS LOADING BASED ON CALCULATED REEL INERTIA AND TAPE POSITION

[75] Inventors: Atsushi Inoue, Chigasaki; Nobuyuki Kaku; Takashi Sasaki, both of Yokohama, all of Japan

[73] Assignee: Hitachi, Ltd., Tokyo, Japan

[21] Appl. No.: 893,072

[22] Filed: Jun. 3, 1992

[30] Foreign Application Priority Data

Jun. 3, 1991 [JP] Japan ............ 3-157411

[51] Int. Cl.$^6$ .................................. G11B 15/665
[52] U.S. Cl. .................... 360/71; 360/85; 360/95
[58] Field of Search .................... 360/71, 85, 95

[56] References Cited

U.S. PATENT DOCUMENTS

| | | | |
|---|---|---|---|
| 4,758,912 | 7/1988 | Yoshihiro et al. | 360/71 |
| 4,868,923 | 9/1989 | Yoshihiro | 360/71 |
| 5,220,477 | 6/1993 | Sorihashi et al. | 360/71 |
| 5,222,684 | 6/1993 | Yoneda et al. | 360/71 X |
| 5,307,215 | 4/1994 | Inoue et al. | 360/71 |

*Primary Examiner*—Aristotelis M. Psitos
*Assistant Examiner*—James L. Habermehl
*Attorney, Agent, or Firm*—Antonelli, Terry, Stout & Kraus, LLP.

[57] ABSTRACT

A tape loading device in a magnetic recording/playback apparatus includes detection units for detecting the rotating direction and the rotation speed of a tape reel of a tape cassette, and a calculation unit for calculating a value of inertia of the tape reel from detected values of the detection units and the operational phase detected by a phase detector. In accordance with the calculated inertia value and the operational phase, a drive signal for a reel motor or a loading motor is controlled to prevent the tape from being damaged during the high-speed tape loading operation.

4 Claims, 13 Drawing Sheets

TAPE LOADING DEVICE IN MAGNETIC RECORDING/PLAYBACK APPARATUS THAT CONTROLS LOADING BASED ON CALCULATED REEL INERTIA AND TAPE POSITION

BACKGROUND OF THE INVENTION

1. Field of the Invention

The present invention relates to a cassette type magnetic recording/playback apparatus, and more particularly to a tape loading device in a magnetic recording/playback apparatus using a large-sized tape cassette.

2. Description of the Prior Art

As disclosed in Japanese Patent Unexamined Publication No. 63-69055, for example, a tape loading device in a cassette type magnetic recording/playback apparatus is conventionally arranged with a movable base on which a tape guide and an inclined tape guide are upwardly mounted, the tape guide having flanges at its upper and lower ends. The base is moved over a guide plate disposed around a rotary head drum, whereupon the tape guide and the inclined tape guide draw a tape out of a tape cassette inserted into the magnetic recording/playback apparatus to wind the tape on the circumferential surface of the rotary head drum, thus defining a predetermined tape travel path.

As to such a magnetic recording/playback apparatus, there have recently been increased demands for a higher degree of performance, such as improving the speed of the tape loading/unloading operations and the access speed. The size of the reel motor has also been enlarged with a higher output. Under additional demands for digital processing in the magnetic recording/playback apparatus and a longer period of recording time, the tape used becomes itself thinner and the tape more likely to damage, and the tape cassette tends itself to enlarge in size. Therefore, influences on the high-speed tape loading operation caused by an increase in inertia of a tape reel of the tape cassette and inertia of the reel motor, as well as a reduction in thickness of the tape are no longer negligible.

In positioning the movable base at the end of the tape loading operation, for example, there arises a problem that even after the aforesaid tape guides for drawing the tape out of the tape cassette have stopped their operation, the tape is excessively let out due to inertia of the tape reel itself, causing the tape to slack around the circumferential surfaces of the tape guides and the rotary head drum or, even worse, to slip off of them, which results in damage of the tape.

Such a phenomenon as slack or slip-off of the tape may be prevented by evenly increasing back tension applied to the tape. This, however, raises another problem that the tape is more apt to be damaged due to torsion and buckling thereof during the tape loading operation.

SUMMARY OF THE INVENTION

It is an object of the present invention to solve the problems as set forth above, and to provide a tape loading device in a magnetic recording/playback apparatus which can prevent a tape from being damaged during tape loading and unloading processes even in a high-speed tape loading operation.

To achieve the above object, the tape loading device of the present invention comprises a tape loading mechanism for taking a tape out of or back into a tape cassette with tape guides, a loading motor for driving the tape loading mechanism, a phase detector for detecting the operational phase of the tape loading mechanism, a reel motor for applying back tension to the tape, detection means for detecting the rotating direction and the rotation speed of each tape reel of the tape cassette, calculation means for calculating a value of inertia of the tape reel from detected values of the detection means and the operational phase detected by the phase detector, calculation means for calculating a speed and an acceleration of drawing-out or taking-up of the tape from the detected values of the detection means and the operational phase detected by the phase detector, and means for controlling the torque on each reel motor in accordance with loading conditions.

When the tape loading and unloading operations are performed, the inertia value calculating means calculates the inertia value of each tape reel and sends the calculated result to the control means for the reel motors. Positions of movement of the tape guides for guiding and moving the tape out of the tape cassette are detected in succession from the operational phase detector or the detection means for detecting the rotating direction and the rotation speed of each tape reel, the detected results being also sent to the control means for the reel motors. Based on the calculated results and the detected positions of movement of the tape guides, the torque to be applied from the reel motor to each tape reel is set and controlled. Consequently, the influence due to the inertia of the reel motors is eliminated, and the tape is protected.

DETAILED DESCRIPTION OF THE PREFERRED EMBODIMENTS

The following is a description of preferred embodiments of the present invention with reference to the drawings.

Figure 2:
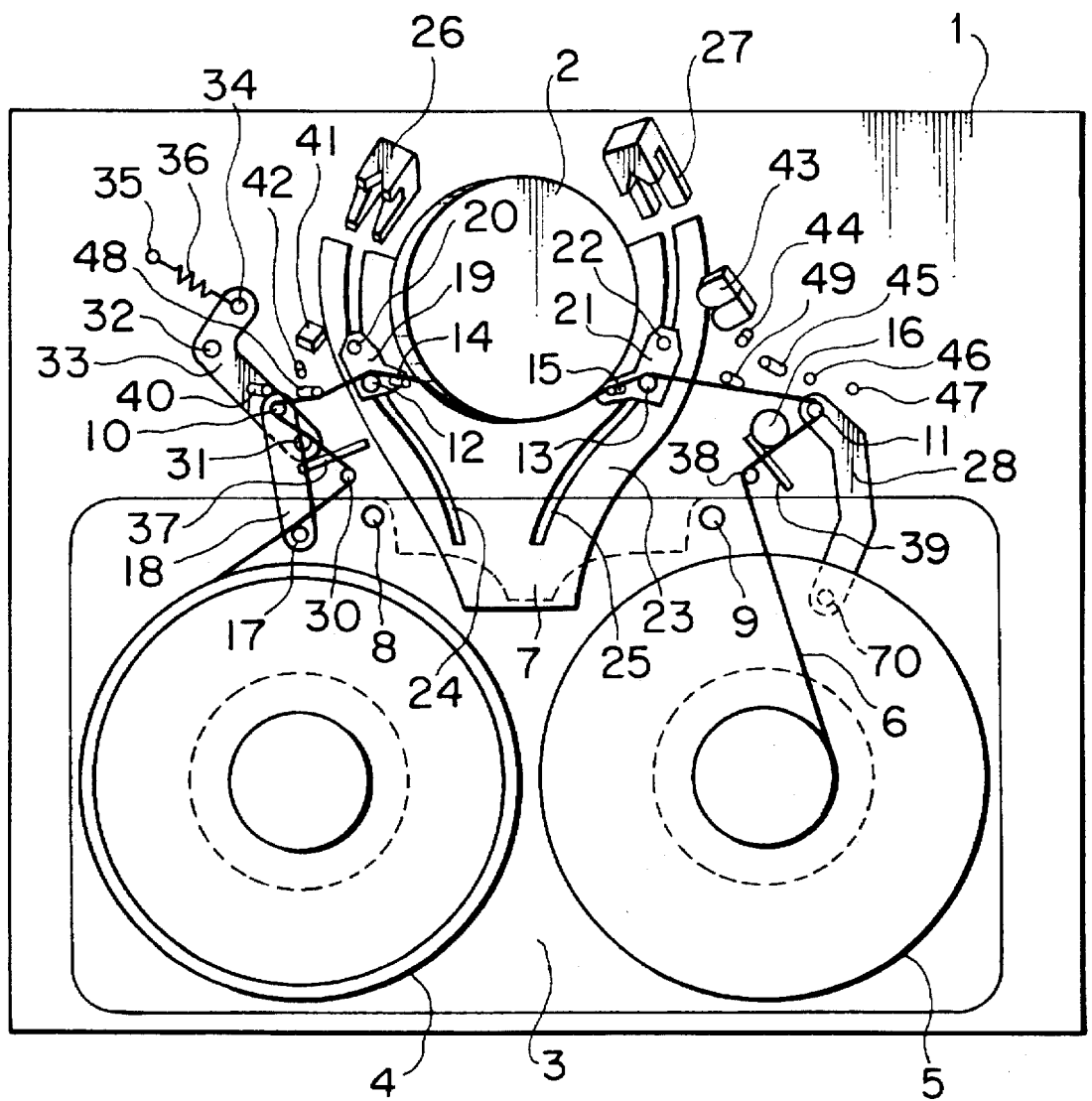
FIG. 2 is a top plan view showing a mechanism section of a tape loading device during the tape loading operation.
Figure 3:
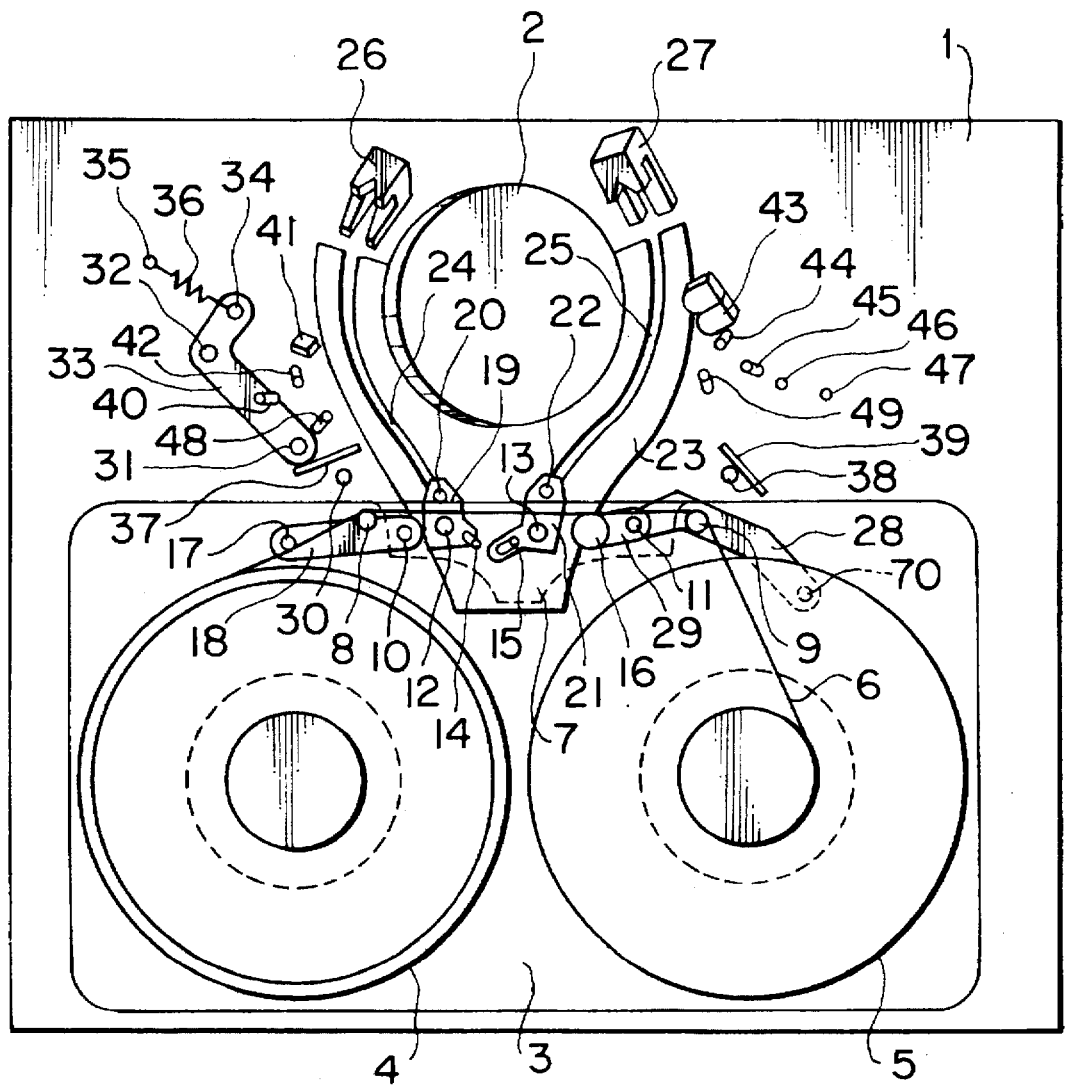
FIG. 3 is a top plan view showing the mechanism section of the tape loading device before the start of the tape loading operation.

First, a mechanism section of a tape loading device will be explained by referring to FIGS. 2, 3 and 4. FIG. 2 is a top plan view showing the tape loading device during the tape loading operation, FIG. 3 is a top plan view showing the tape loading device before the start of the tape loading operation, and FIG. 4 is a top plan view showing the tape loading device after the end of the tape loading operation.

In FIG. 2, a rotating magnetic head (not shown) for recording/playback is mounted on a rotary head drum unit 2. An opening 7 is formed in the front side of a tape cassette 3 inserted in place with a tape 6 stretching through the opening 7, as shown in FIG. 3, before the start of the tape loading operation. In this condition, the opening 7 also accommodates a supply side draw-out guide 10, a tape guide 12 and an inclined tape guide. Both tape guide 12 and inclined tape guide 14 extend upwardly from; a movable base 19 moving on the supply side opening 7 also accommodates an inclined tape guide 15 and a tape guide 13, both of which extend upwardly from a movable base 21 moving on the take-up side, a pinch roller 16, and a take-up side draw-out guide 11.

The movable bases 19, 21 are driven by a loading motor (FIG.5) to move along respective guide grooves 24, 25 formed on a guide plate 23. At the end of the tape loading operation, the movable bases 19, 21 are positioned and held by respective fixing means 26, 27 provided in the vicinity of the rotary head drum unit 2 on the opposite sides, so that the tape 6 is wound around the circumference of the rotary head drum unit 2 over a predetermined angular range as depicted in FIG. 4.

Figure 4:
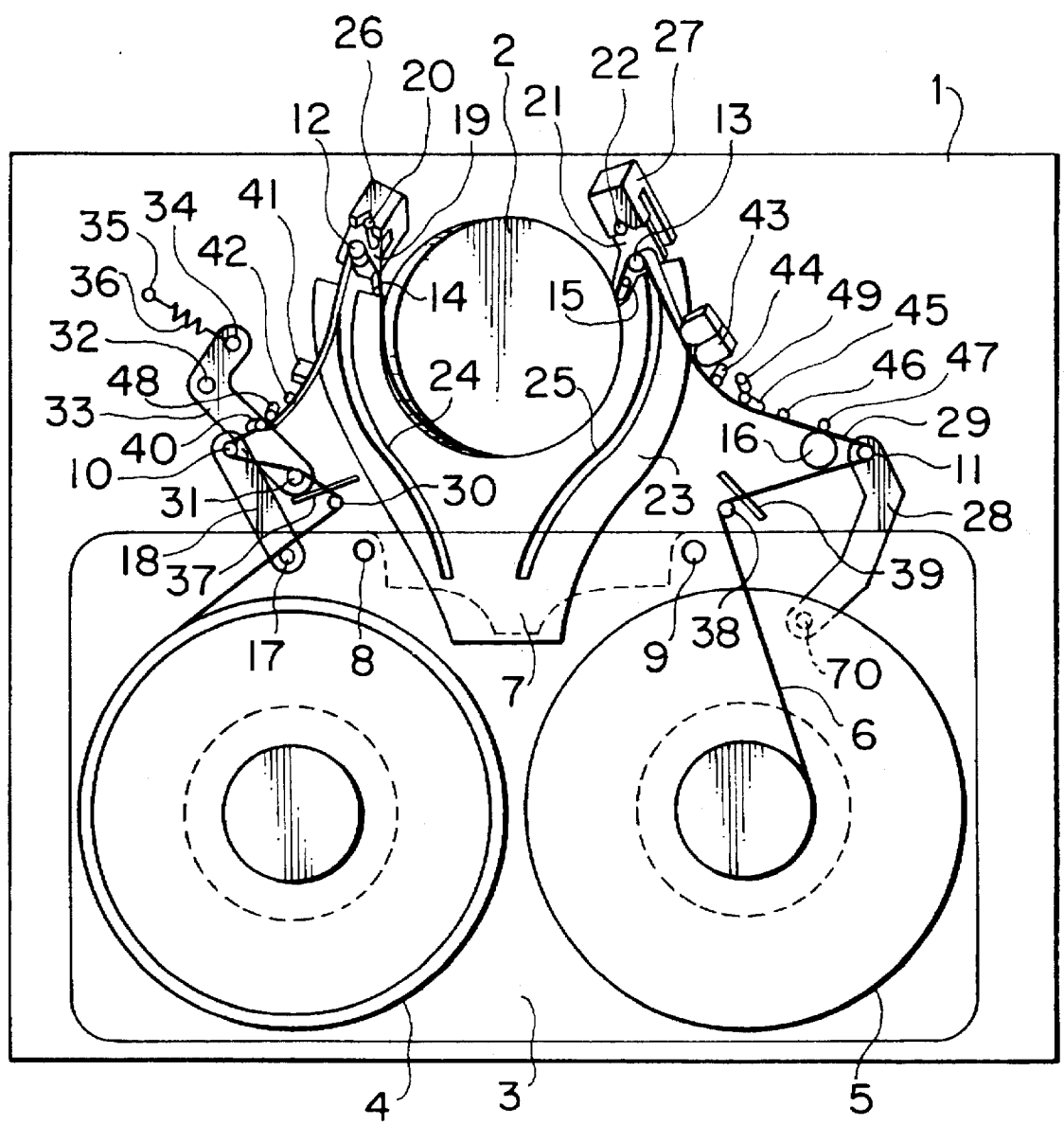
FIG. 4 is a top plan view showing the mechanism section of the tape loading device after the end of the tape loading operation.

The supply side draw-out guide 10 is also driven by the loading motor 106 and positioned at a location shown in FIG. 4 to define a tape travel path on the tape supply side. More specifically, as soon as the tape loading operation starts, the tape 6 is drawn by the supply side draw-out guide 10 out of the tape cassette 3 in such a manner that the tape 6 first passes around a supply side tape guide 30 and a tension pin 31 for detecting tape tension, then contacts via the supply side draw-out guide 10 with an inclined tape guide 40, a tape guide 42 and a full-width eraser head 41, and is finally wound around the rotary head drum unit 2 by the tape guide 12 and the inclined tape guide 14, both of which are on the movable base 19.

Likewise, the take-up side draw-out guide 11 is also driven by the loading motor 106 and positioned at a location shown in FIG. 4 to define such a tape travel path on the tape take-up side that the tape 6 first reaches the inclined tape guide 15 and the tape guide 13, both on the take-up side movable base 21, via the rotary head drum unit 2, then contacts with an A/C head 43, and passes around a tape guide 44, an inclined tape guide 45 and a tape guide 46, and finally reaches a take-up reel 5 of the tape cassette 3 via a capstan 47, a take-up side draw-out guide 45 and a tape guide 38.

As shown in FIG. 4, the tape travel path established at the end of the tape loading operation is defined three-dimensionally by the four inclined tape guides 40, 14, 15, 45. In that condition, the capstan 47 holds the tape 6 in cooperation with the pinch roller 16 while coming into press-contact with the tape. The capstan 47 is driven by a capstan motor (not shown) to move the tape 6.

Note that the tape unloading operation proceeds in a reversed manner to the above tape loading operation.

Figure 5:
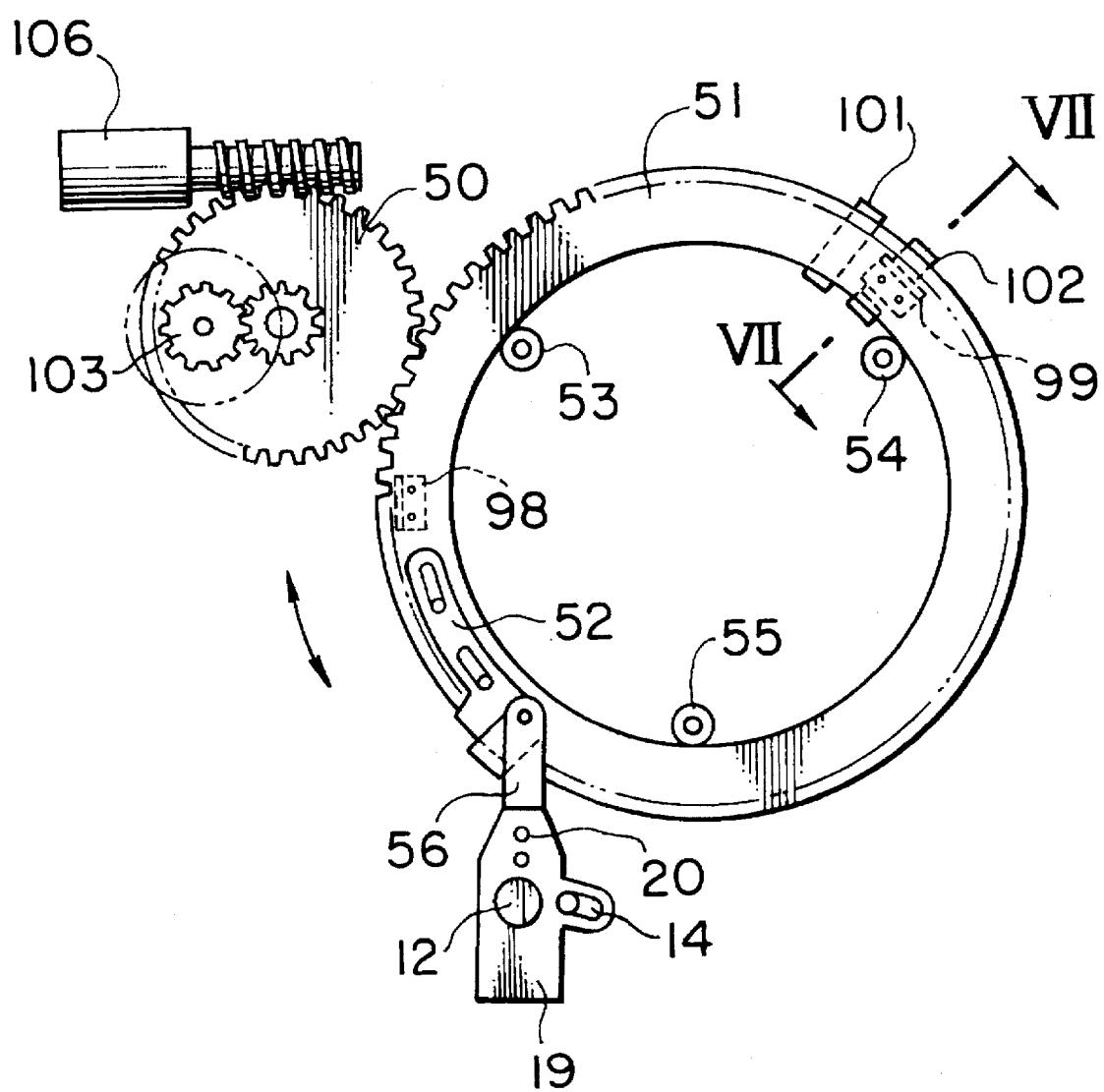
FIG. 5 is a top plan view showing a supply side movable base driving mechanism in the mechanism section of the tape loading device.
Figure 6:
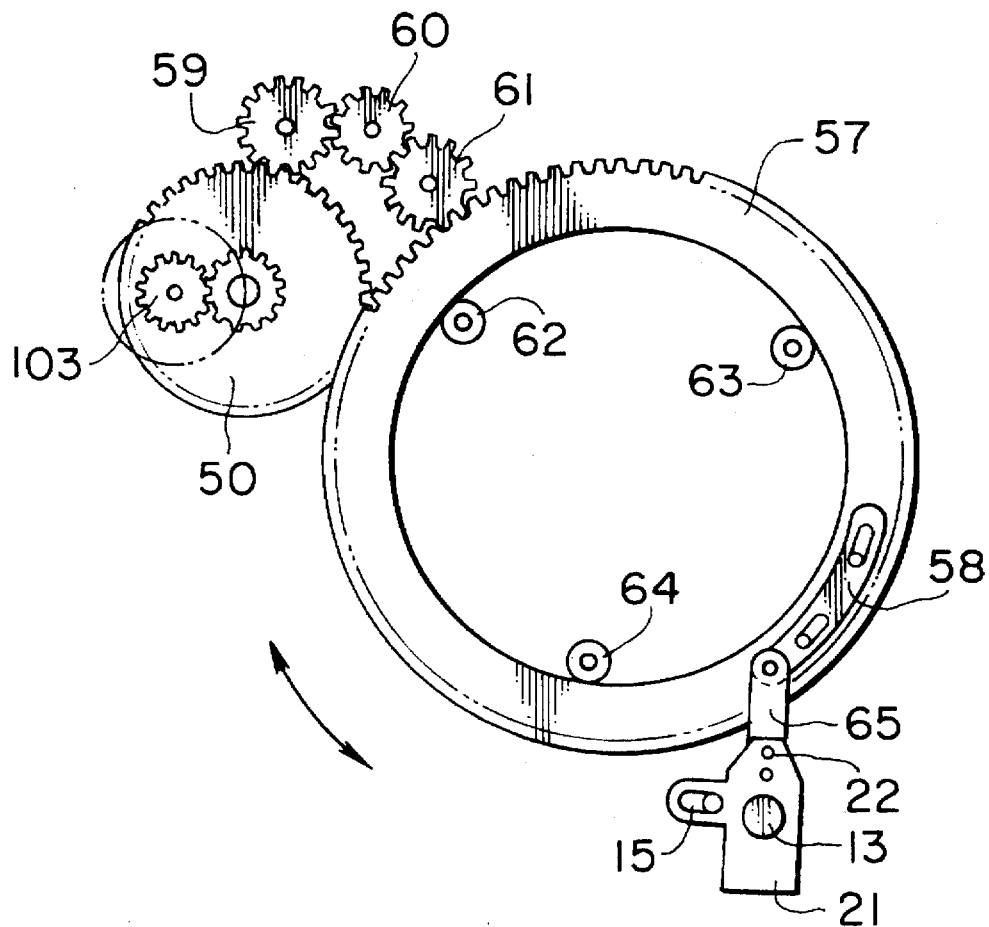
FIG. 6 is a top plan view showing a take-up side movable base driving mechanism in the mechanism section of the tape loading device.
Figure 7:
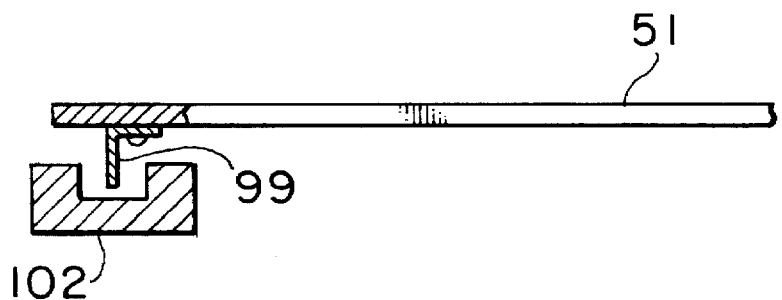
FIG. 7 is a sectional view taken along line VII—VII in FIG. 5 and showing a state in which the end of the tape unloading operation is detected in the mechanism section of the tape loading device.

The tape loading and unloading operations as explained above are performed by operation of mechanisms shown in FIGS. 5 to 9. FIG. 5 shows a supply side movable base driving mechanism and FIG. 6 shows a take-up side movable base driving mechanism.

First, in FIG. 5, a slide plate 52 is attached to a supply side loading ring 51, and the supply side movable base 19 is coupled to the slide plate 52 via a joint plate 56. Though not shown, the slide plate 52 is normally biased by a spring in one direction. Even after the movable base 19 has moved along the guide groove 24 (see FIG. 2) on the guide plate 23 and has abutted against the fixing means 26 as shown in FIG. 4 through the above tape loading operation, the loading ring 51 is caused to continue rotation over a certain distance against resilient force of the spring so that the movable base 19 is positioned with respect to the fixing means 26 in a press-contact state. On the take-up side shown in FIG. 6, the movable base 21 coupled to a loading ring 57 is similarly positioned with respect to the fixing means 27 in a press-contact state through rotation of the loading ring 57.

While the supply side loading ring 51 and the take-up side loading ring 57 are arranged around the rotary head drum unit 2 (see FIG. 2) by respective sets of three support members 53, 54, 55 and 62, 63, 64 in concentric relation to each other, those loading rings are located at different levels so as to avoid interference therebetween. The loading rings 51, 57 are driven by the loading motor 106, as a single drive source shared by both, via a cam gear 50 to rotate around the respective sets of three support members 53, 54, 55 and 62, 63, 64. The loading ring 51 is directly driven by the cam gear 50, whereas the loading ring 57 is driven via a group of driving force transmitting gears 59, 60, 61. Thus, the loading rings 51, 57 are rotated in opposite direction.

A potentiometer 103 detects the position of progress of the tape loading operation. Sensors 101, 102 for respectively detecting the end position of the tape loading operation and the end position of the tape unloading operation are installed below the supply side loading ring 51, as shown in FIG. 5, with shutters 98, 99 attached to the rear surface of the supply side loading ring 51. Then, the end of the tape unloading operation is detected upon the shutter 99 entering the sensor 102 as shown FIG. 7, and, likewise, the end of the tape loading operation is detected upon the shutter 98 entering the sensor 101.

Figure 8:
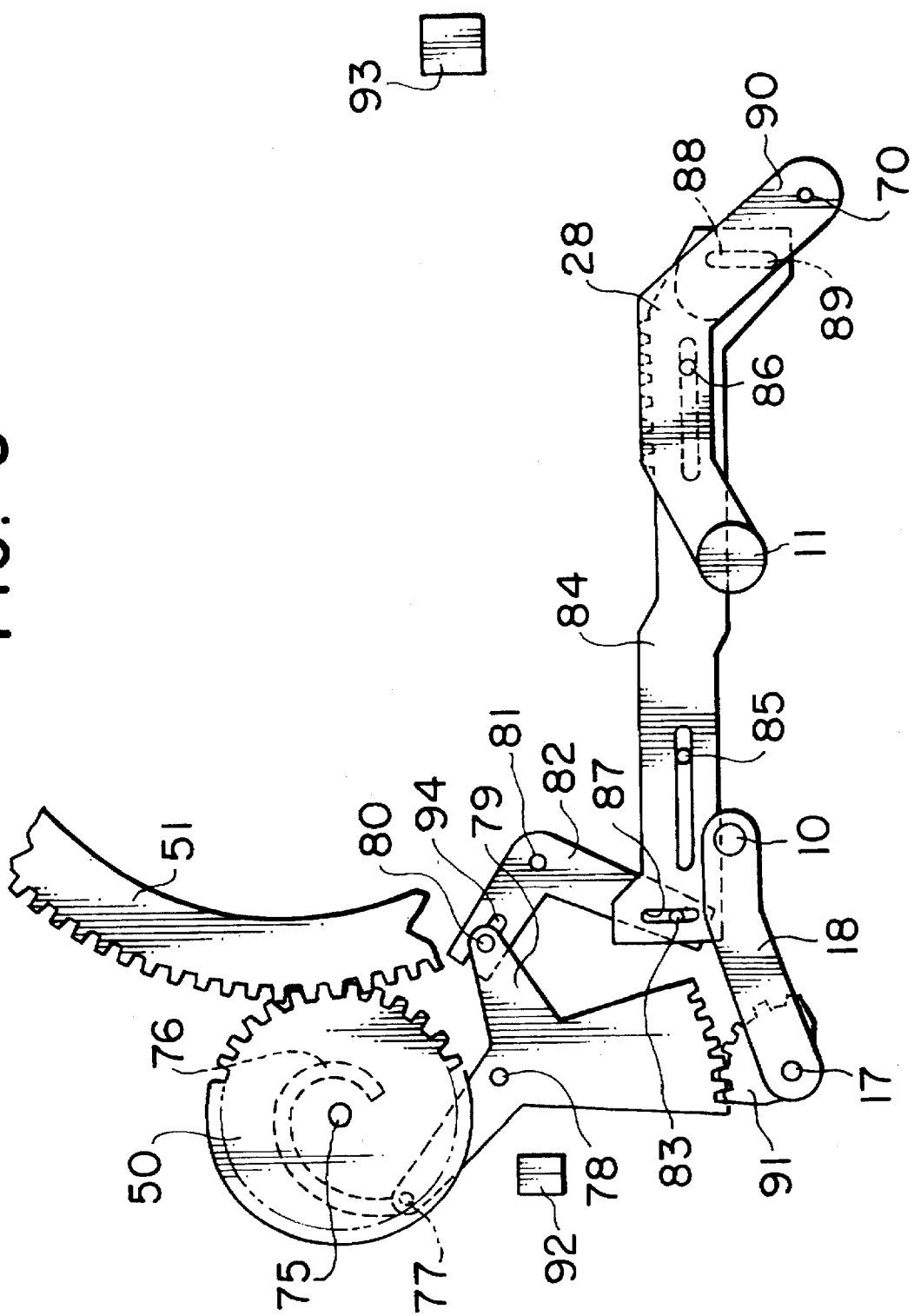
FIG. 8 is a top plan view showing a driving mechanism for a supply side draw-out guide 10 and a take-up side draw-out guide 11 in FIGS. 2 to 4 before the start of the tape loading operation.
Figure 9:
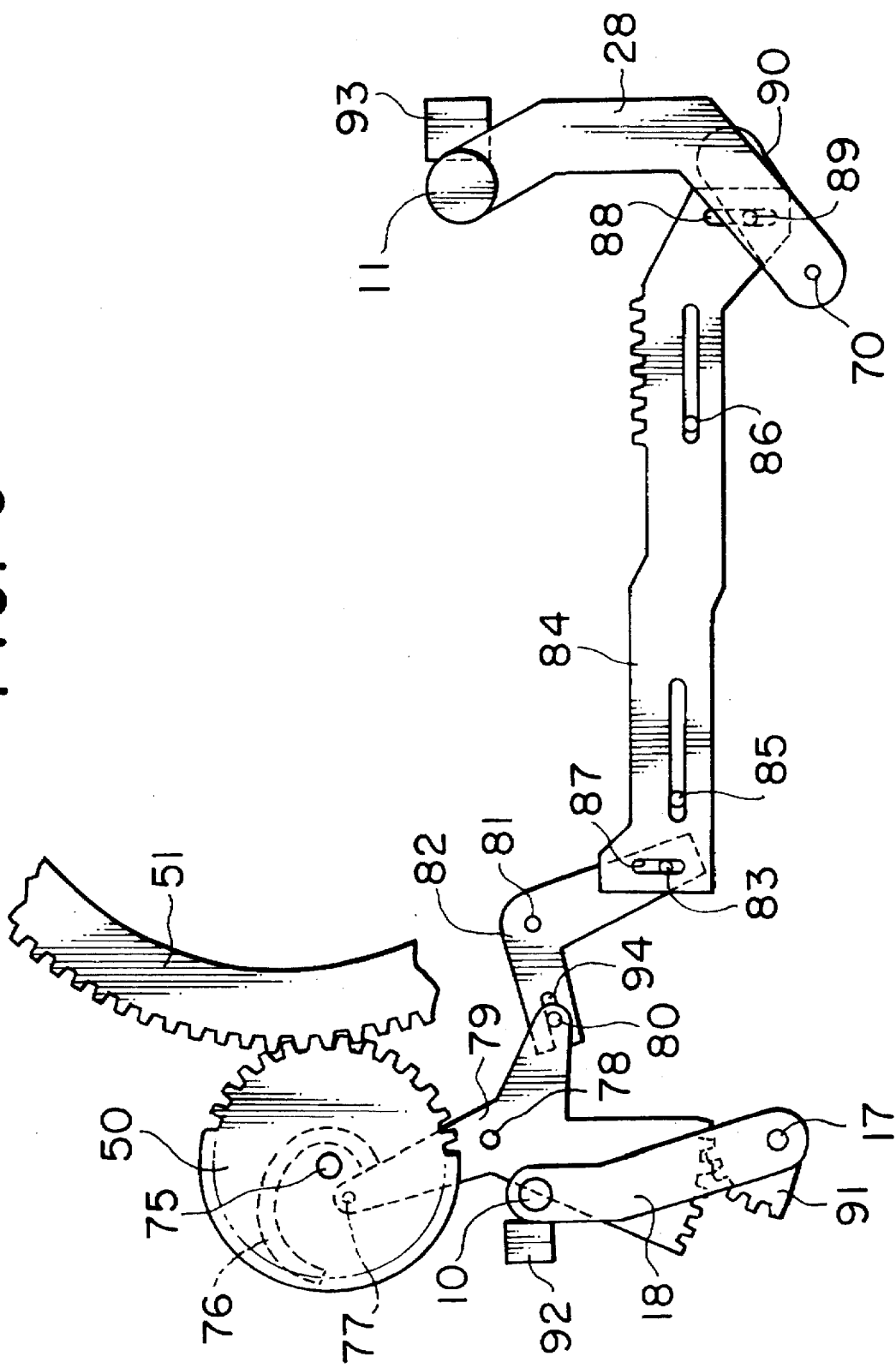
FIG. 9 is a top plan view showing the driving mechanism for the supply side draw-out guide 10 and the take-up side draw-out guide 11 in FIGS. 2 to 4 after the end of the tape loading operation.

FIGS. 8 and 9 show a driving mechanism for the supply side draw-out guide 10 and the take-up side draw-out guide 11 in FIGS. 2 to 4. FIG. 8 is a top plan view showing the driving mechanism before the start of the tape loading operation, and FIG. 9 is a top plan view showing the driving mechanism after the end of the tape loading operation.

In FIG. 8, when the loading motor 106 (see FIG. 5) rotates in the direction of loading the tape, the cam gear 50 is also turned about a turning support point 75 in the direction of loading the tape. A drive arm 79, having a sector gear formed at its one end is thereby turned about a turning support point 78 due to a pin 77 of the drive arm 79 which engages in a cam groove 76 formed in the underside of the cam gear 50.

The sector gear of the drive arm 79 is held in mesh with a gear 91 which shares a support point 17 with a draw-out arm 18 having the supply side draw-out guide 10 attached to its one end. Therefore, as the drive arm 79 turns, the supply side draw-out guide 10 is turned counterclockwise about the support point 17 to draw out the tape 6. Further, an opposite end of the drive arm 79 is coupled to one end of an L-shaped joint arm 82 by a pin 80, provided at the opposite end of the drive arm 79, being fitted into a cutout groove 94, of the joint arm 82, and the other end of the joint arm 82 is coupled to a slider 84 by a pin 83, provided at the other end of the joint arm 82, being fitted into a groove 87, of the slider 84. When the slider 84 is driven to slide right-wardly upon turning of the drive arm 79, a draw-out arm 28 turns about a turning support point 70 so that the take-up side draw-out guide 11 is turned to draw out the tape 6. At the end of the tape loading operation, the driving mechanism comes into a state shown in FIG. 9. The tape unloading operation proceeds in a reversed manner to the above tape loading operation.

Thus, the tape loading and unloading operations are performed by the driving force transmitted from the loading motor 106 to the loading rings 51, 57 and the drive arm 79 via the cam gear 50. Since the turning phase of the cam gear 50 corresponds in one-to-one relation to an output signal of the potentiometer 103 held in mesh with the cam gear 50 and rotating therewith, the respective positions in progress of the tape loading and unloading operations can be known by detecting the output signal of the potentiometer 103.

Figure 1:
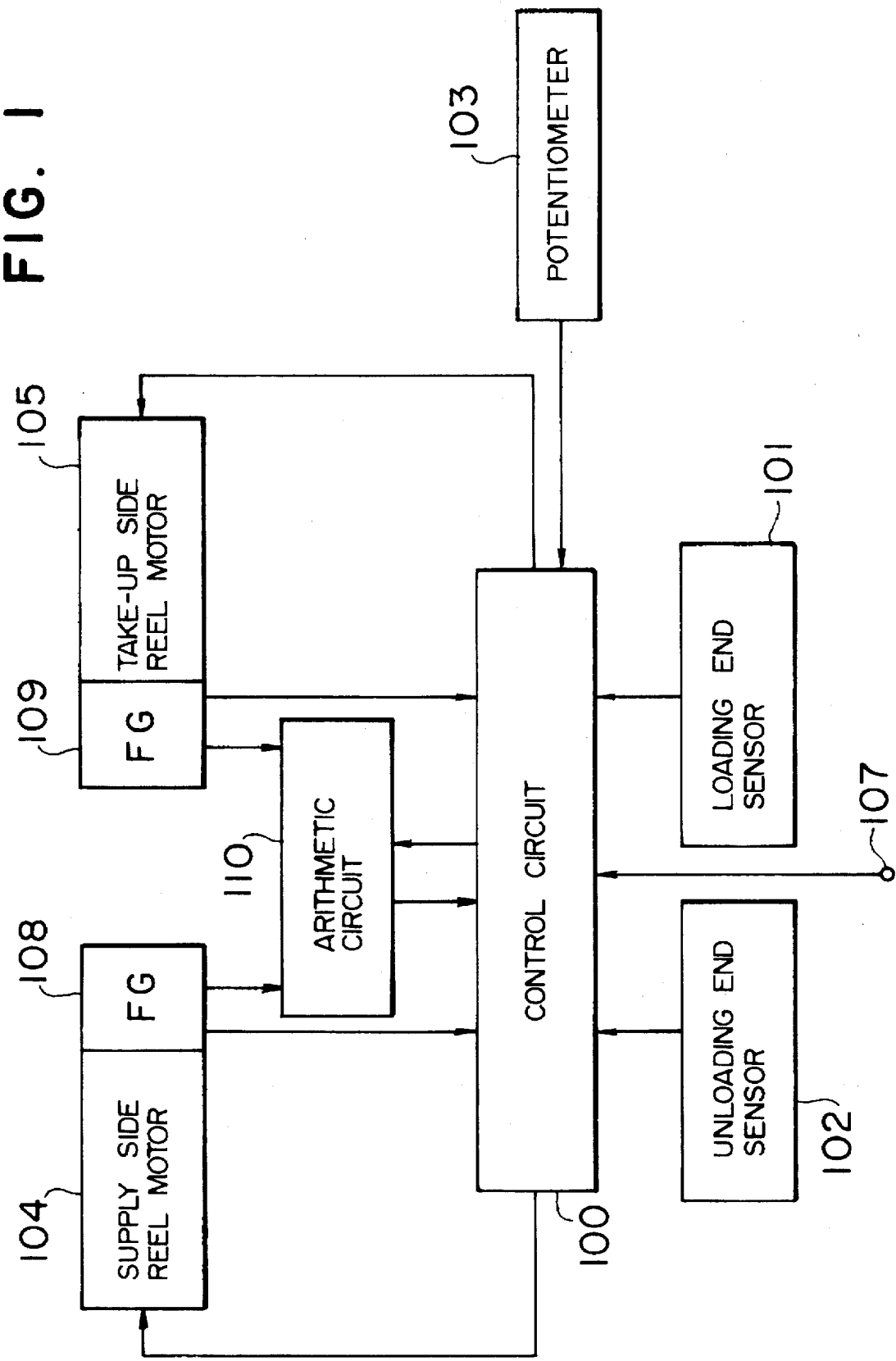
FIG. 1 is a system block diagram showing a first embodiment of a magnetic recording/playback apparatus according to the present invention.

FIG. 1 is a system block diagram showing a first embodiment of the tape loading device according to the present invention, the tape loading device being equipped with a mechanism section as explained above. Referring to FIG. 1, denoted by reference numeral 100 is a control circuit, 101 is a loading end sensor, 102 is an unloading end sensor, 103 is a potentiometer, 104 is a supply side reel motor, 105 is a take-up side reel motor, 107 is a signal input terminal, 108, 109 are frequency generators (hereinafter referred to as FG for brevity), and 110 is an arithmetic circuit.

In FIG. 1, the loading end sensor 101 detects the end of the tape loading operation when it occurs and outputs a signal (hereinafter referred to as a tape loading operation end signal). Likewise, the unloading end sensor 102 detects the end of the tape unloading operation when it occurs and outputs a signal (hereinafter referred to as a tape unloading operation and signal). These signals are supplied to the control circuit 100. Additionally, an output signal of the potentiometer 103 as a phase detector, an output signal of the FG 108 corresponding to the rotation speed and the rotating direction of the supply side reel motor 104, as well as an output signal of the FG 109 corresponding to the rotation speed and the rotating direction of the take-up side reel motor 105 are also supplied to the control circuit 100. The arithmetic circuit 110 calculates respective diameters of the tape wound around the supply side reel 4 and the take-up side reel 5 (see FIG. 2) and respective inertia values thereof, the calculated results being further supplied to the control circuit 100.

In the control circuit 100, the output signal of the potentiometer 103 is counted. More specifically, for the tape loading operation, the count value is reset to zero upon receiving the tape unloading operation end signal from the unloading end sensor 102 and, thereafter, it is begun to gradually increase in the direction of tape loading. Conversely, for the tape unloading operation, the count value is reset to zero upon receiving the tape loading operation end signal from the loading end sensor 101 and, thereafter, it is begun to gradually increase in the direction of tape unloading.

When the tape cassette is inserted in place, the same torque is applied to both the reel motors 104, 105 for a certain period of time before the start of the tape loading operation. If the diameters of the tape wound around the tape reels 4, 5 are different from each other at this time, the tape 6 travels toward that tape reel which has the smaller diameter of the wound tape, and the arithmetic circuit 110 calculates the diameter ratio of the wound tape between the tape reels 4 and 5 based on data of the rotation speeds and the rotating directions of the tape reels 4, 5 respectively indicated by the then output signals of the FG's 108, 109, the calculated results being supplied to the control circuit 100. Subsequently, the control circuit 100 applies to the reel motors 104, 105 respective reel torques corresponding to the calculated diameter ratio of the wound tape, thereby starting the tape loading operation.

Figure 10A:
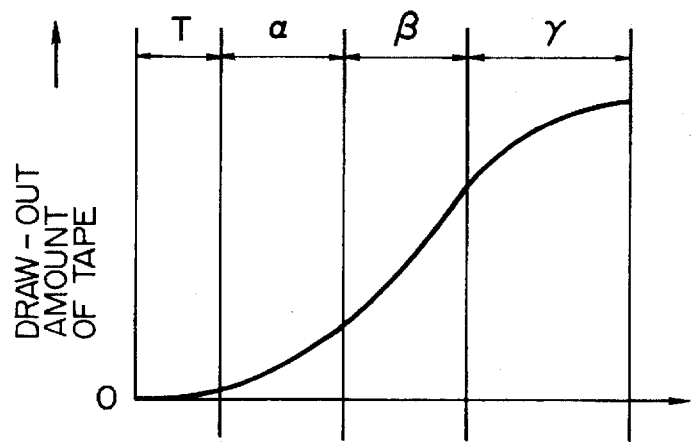
FIGS. 10A to 10C are charts showing the successive operational status for respective parameters in the embodiment of FIG. 1 after the start of the tape loading operation.
Figure 10B:
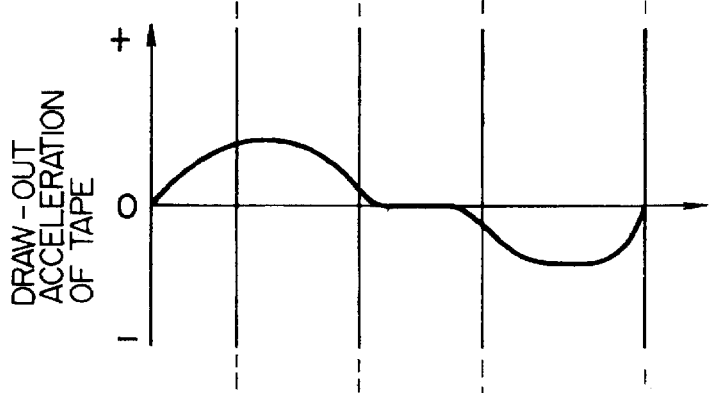
Figure 10C:
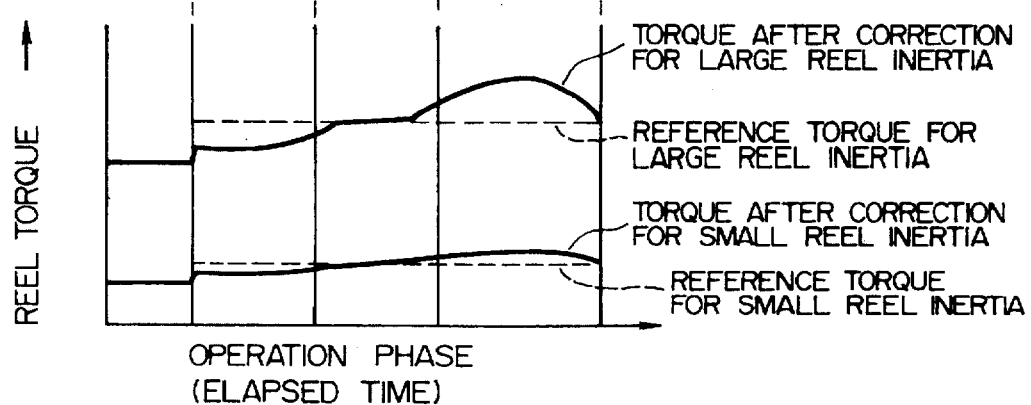

FIG. 10 shows the successive operational status after the start of the tape loading operation; i.e., FIG. 10A shows changes in the draw-out amount of tape, FIG. 10B shows changes in the draw-out acceleration of tape, and FIG. 10C shows changes in the torques applied to the reel motors. In each chart, the abscissa represents the phase of the tape loading operation (operational phase) or elapsed time.

Figure 11:
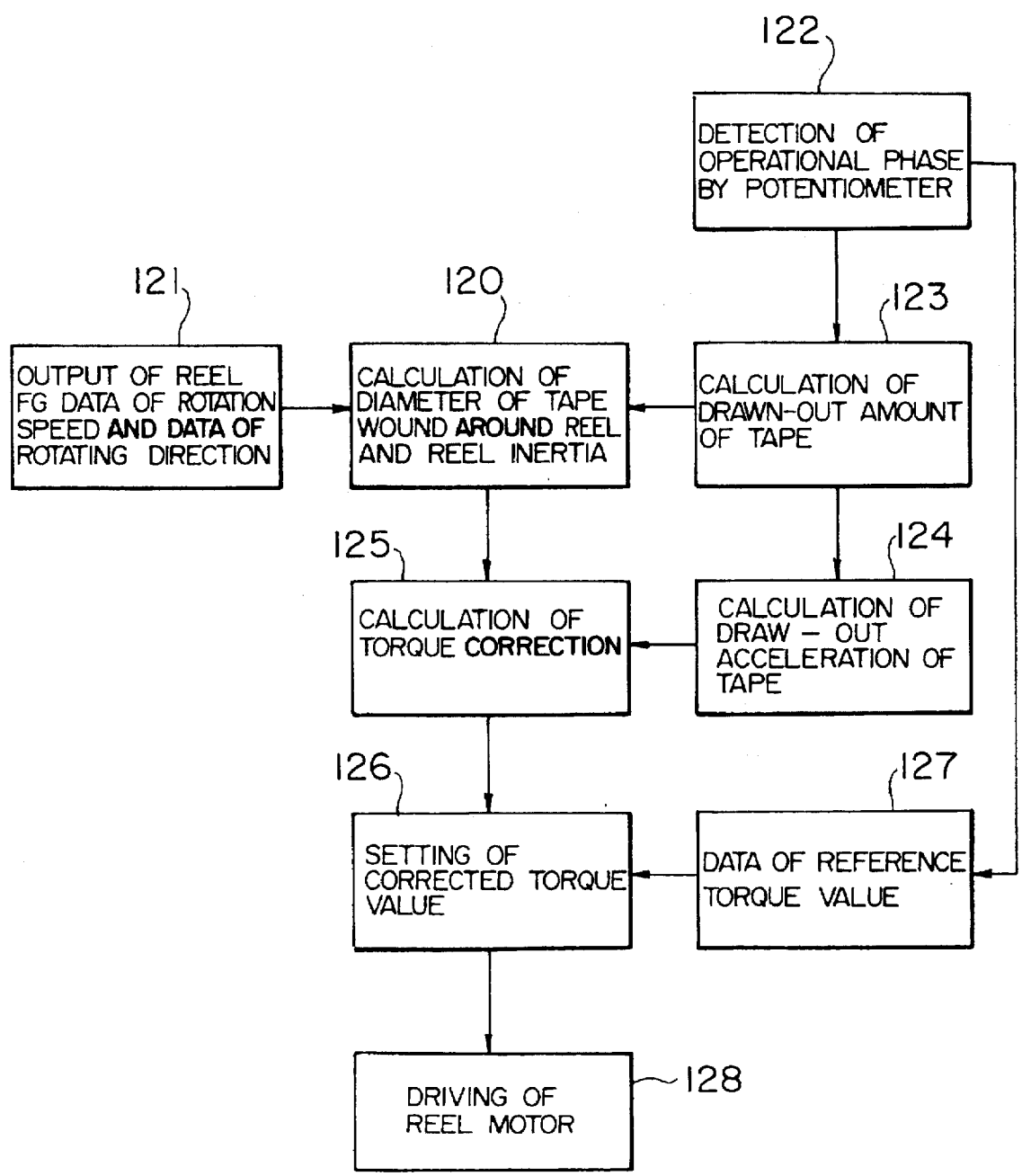
FIG. 11 is a block diagram flow chart showing a process for calculation of inertia to control a reel motor in the embodiment of FIG. 1.

FIG. 11 is a block diagram flow chart showing a process for calculation of inertia to control of the reel motor.

In FIGS. 10 and 11, because the position of progress of the tape loading operation corresponds to an output value 122 of the potentiometer 103 in a one-to-one relation as stated before, the position of progress of the tape loading operation also corresponds to a draw-out amount 123 of tape a one-to-one relation. In view of the above, based on the output value of the potentiometer 103 and data 121 indicated by the output signals of the FG's 108, 109 at a certain position after the start of the tape loading operation, the arithmetic circuit 110 calculates the respective diameters of the tap wound around the tap reels 4, 5 and the respective inertia values thereof (as shown at 120 in FIG. 11). This calculation period is a period T in FIG. 10. From the above calculated results, the control circuit 100 sets torques to be applied to the reel motors 104, 105, followed by applying the set torques to them.

In this embodiment, reference torques applied to the tape reels 4, 5 are set so as to provide the respective same tension values for the tape wound into the different diameters, as indicated by broken lines in FIG. 10C. These reference torques are corrected in accordance with the respective inertia values as indicated by solid lines in FIG. 10C. However, it is a matter of course that the setting values of reference torques are not necessarily constant and may be determined depending on the types of the mechanism or system, as well as operational phase in the same system.

The above correction of reference torques are performed as follows. Changes in the draw-out amount of the tape with respect to the operational phase or elapsed time are calculated in succession by the control circuit 100 from changes in the output value of the potentiometer 103 and, simultaneously, changes in the draw-out speed of the tape and the draw-out acceleration of the tape shown in FIG. 10B are also calculated (at 124 in FIG. 11). The draw-out acceleration of the tape thus calculated in succession is multiplied by an inertia correcting coefficient for each tape reel 4, 5 (at 125 in FIG. 11). The multiplied result is added with the reference torque corresponding to the operational phase (at 126, 127 in FIG. 11), followed by driving each reel motor 104, 105 with the corrected torque (at 128 in FIG. 11). On this occasion, when the draw-out amount of the tape is accelerated to increase, the torque is corrected such that it becomes smaller. This corresponds to a zone β in FIG. 10. Conversely, when the draw-out amount of the tape is decelerated to decrease, the torque is corrected such that it becomes larger. This corresponds to a zone γ in FIG. 10.

As long as the system has a function to determine and control the draw-out amount of the tape with respect to phase of the tape loading operation or elapsed time, such changes in the draw-out acceleration of the tape can also be controlled in a like manner to the above by holding information on changes in the draw-out amount and the draw-out acceleration of tape, as known data, in the control circuit 100. Further, taking into account a response time of the reel motor, the system may be controlled to issue the command for driving the reel motor with the aforesaid corrected torque in advance of the response time.

The correction of reference torques during the tape unloading operation is similarly performed, but the reference torques are corrected in a reversed manner to the above tape loading operation considering that the draw-out amount and the draw-out acceleration of the tape are respectively replaced by the take-up amount and the take-up acceleration of the tape in the tape unloading operation. In other words, when the take-up amount of the tape is accelerated to increase, the torque is corrected such that it becomes larger and, when it is decelerated to decrease, the torque is corrected such that it becomes smaller.

As a result of the above-mentioned control, influences caused by inertia of the tape reels, etc. during the tape loading and unloading operations can be eliminated to achieve protection of the tape in the high-speed loading operation.

Figure 12A:
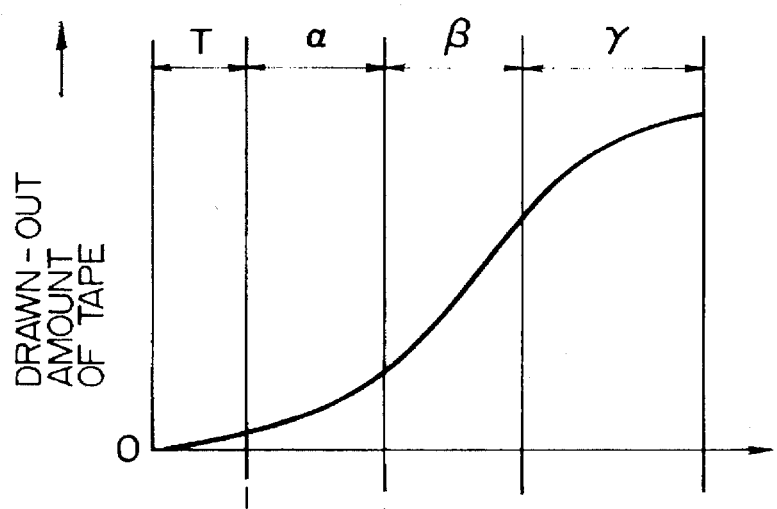
FIGS. 12A to 12C are charts showing the successive operational status for respective parameters during the tape loading operation in another embodiment of the tape loading device in a magnetic recording/playback apparatus according to the present invention.
Figure 12B:
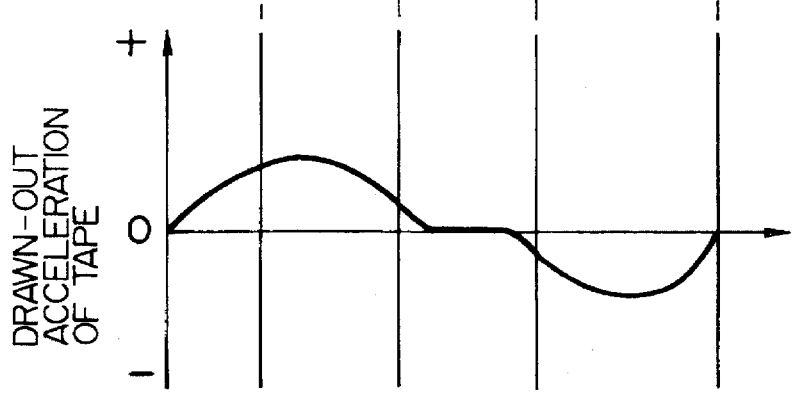
Figure 12C:
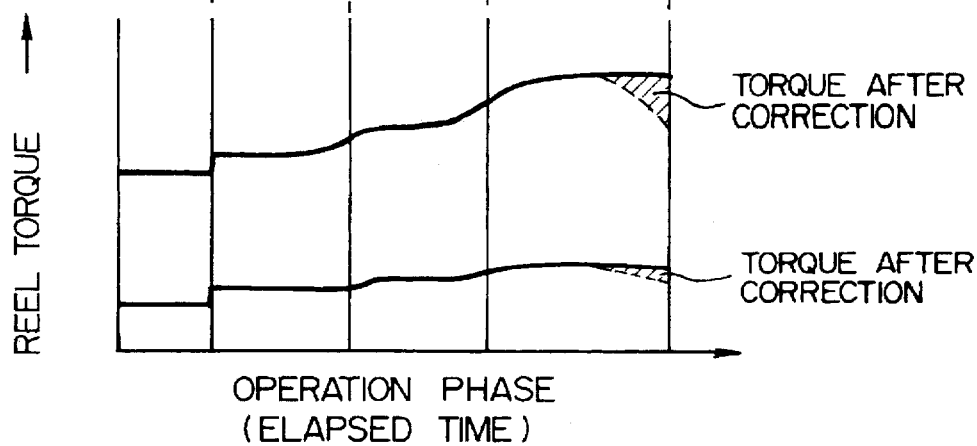

FIG. 12 shows the successive operational status for respective parameters during the tape loading operation in another embodiment of the tape loading device in a magnetic recording/playback apparatus according to the present invention.

In the foregoing embodiment, since the draw-out acceleration of the tape is zero at the end of the tape loading operation, the torque to be added to the reference torque for correction is also zero. At this time, however, even with the draw-out acceleration being zero, the tape reel continues rotation at a certain speed, and this reel speed becomes momentarily zero at the same time as the end of the tape loading operation. This means that the deceleration becomes infinite at that moment.

On the other hand, in the embodiment of FIG. 12, correction torque is applied to each tape reel in accordance with the inertia value at the end of the tape loading operation even with the draw-out acceleration of tape being zero.

Figure 13:
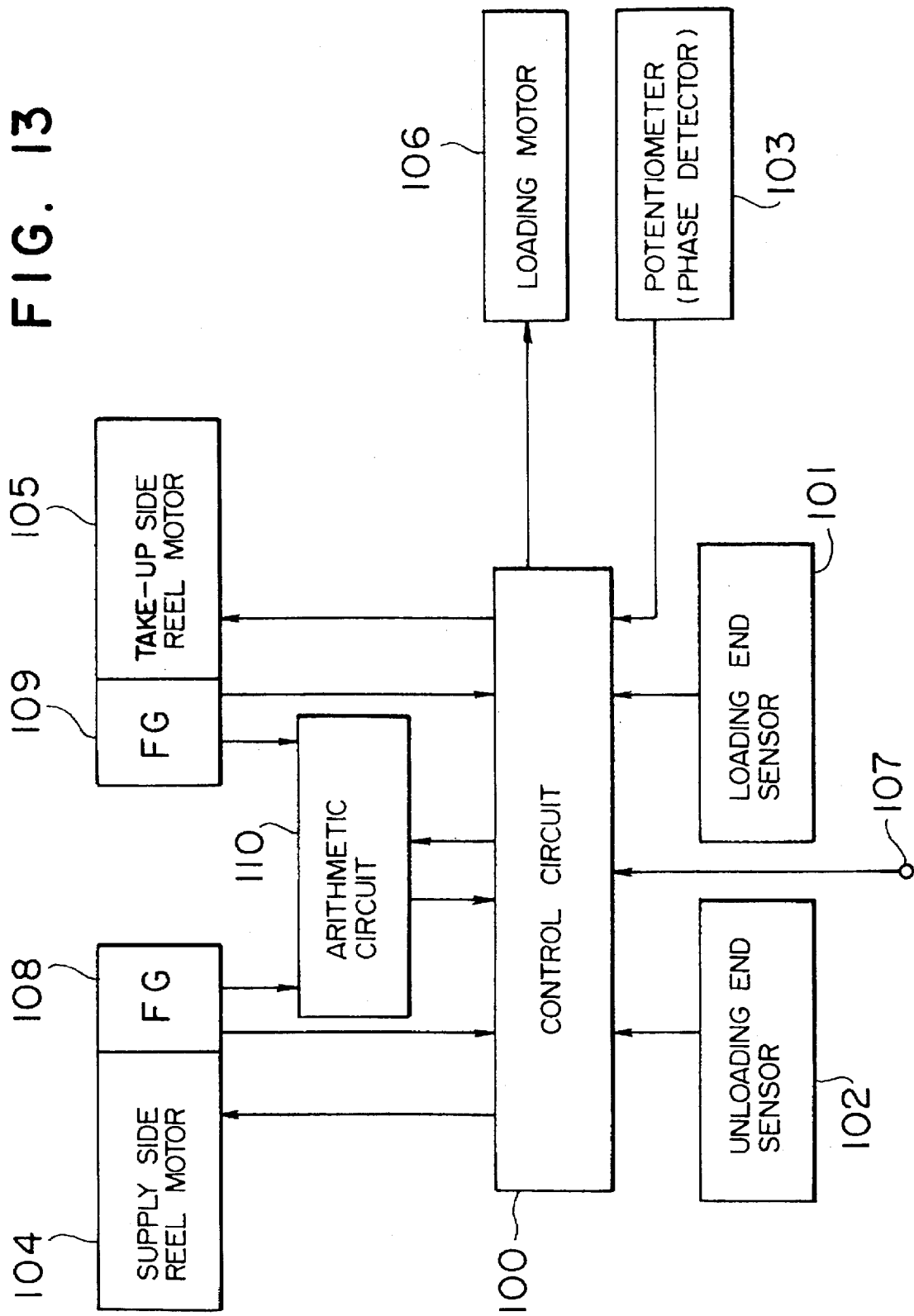
FIG. 13 is a system block diagram showing still another embodiment of the magnetic recording/playback apparatus according to the present invention.
Figure 14:
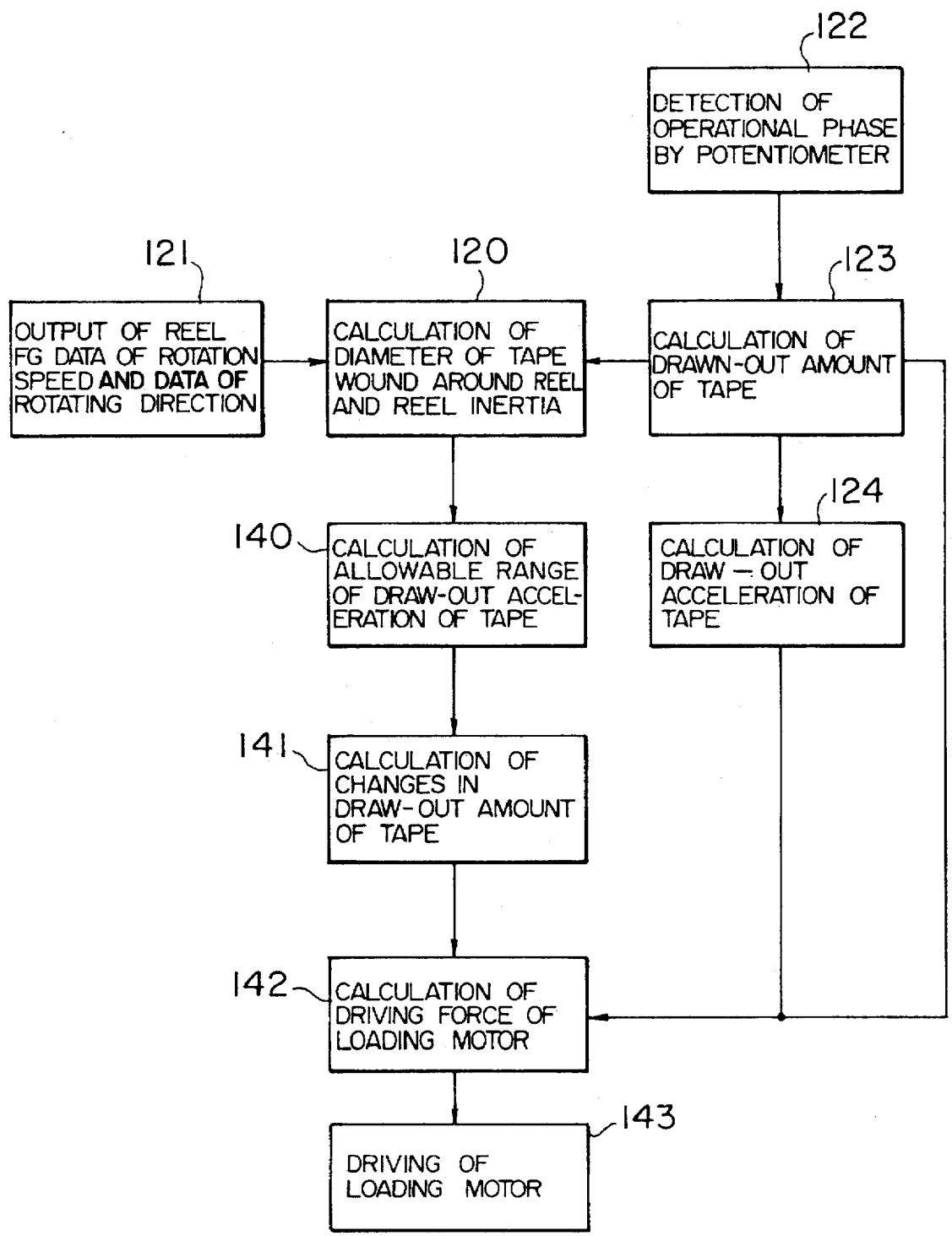
FIG. 14 is a block diagram flow chart showing a process from calculation of inertia to control of a reel motor in the embodiment of FIG. 13.

FIG. 13 is a system block diagram showing still another embodiment of the magnetic recording/playback apparatus according to the present invention, in which corresponding parts to those in the preceding drawings are denoted by the same reference numerals. FIG. 14 is a block diagram flow chart showing a process from calculation of inertia to control of the reel motor in the embodiment of FIG. 13.

This embodiment is a modification the embodiment shown in FIG. 1 such that the loading motor 106 is controlled by the control circuit 100. The diameters of tape wound around the respective tape reels and the inertia values thereof are calculated in the same manner as that in the embodiment of FIG. 1 (at 120 to 123 in FIG. 14). This embodiment is different from the embodiment of FIG. 1 in that an allowable range of the draw-out (or take-up) acceleration of tape is calculated from known relationships using the above calculated results (at 140 in FIG. 14), a corresponding change range of the draw-out (or take-up) amount of the tape is determined (at 141 in FIG. 14), and further the driving output of the loading motor 106 is controlled so as to fall in that range. Thereby, influences caused by inertia of the tape reels can be eliminated for protection of the tape.

According to the present invention, as described above, the inertia value of each tape reel is calculated during the tape loading and unloading operations, and the torque applied to each reel motor or the output of the loading motor is controlled based on the calculated result and data about the position of operational movement of the tape loading mechanism. It is thus possible to eliminate influences caused by inertia of the tape reels, etc. and achieve protection of the tape.

What is claimed is:

1. A tape loading device for a magnetic recording/playback apparatus, said apparatus adapted for insertion thereinto of a tape cassette containing a magnetic tape, said tape loading device comprising:

tape guides for defining a tape travel path, a tape loading mechanism for controlling said tape guides to move a tape out of a tape cassette which has been inserted into the magnetic recording/playback apparatus, to the tape travel path, and back from the tape travel path into the tape cassette, a loading motor for driving said tape loading mechanism, a phase detector for detecting the operational phase of said tape loading mechanism, a reel motor for applying back tension to the tape, detection means for detecting the rotating direction and the rotation speed of each tape reel of the tape cassette, first calculation means responsive to the values of rotating direction and rotation speed detected by said detection means and the operational phase detected by said phase detector, or calculating a value of inertia for each tape reel, second calculation means responsive to the operational phase detected by said phase detector, for calculating the speed and acceleration of drawing-out or taking up of the tape, and control means responsive to the calculated inertia, the operational phase, and the calculated speed and acceleration, for controlling said reel motor to control tension on the tape.

2. A tape loading device in a magnetic recording/playback apparatus according to claim 1, wherein said control means includes means for controlling the driving signal for said reel motor such that even if the acceleration of drawing-out of the tape is zero at the end of the tape loading operation, a correction torque corresponding to the calculated value of inertia of each tape reel is applied to each tape reel.

3. A tape loading device for a magnetic recording/playback apparatus, said apparatus adapted for insertion thereinto of a tape cassette containing a magnetic tape, said tape loading device comprising:

tape guides for defining a tape travel path, a tape loading mechanism for controlling said tape guides to move a tape out of a tape cassette which has been inserted into the magnetic recording/playback apparatus, to the tape travel path, and back from the tape travel path into the tape cassette, a loading motor for driving said tape loading mechanism, a phase detector for detecting the operational phase of said tape loading mechanism, a reel motor for applying back tension to the tape, detection means for detecting the rotating direction and the rotation speed of each tape reel of the tape cassette, first calculation means responsive to the values of rotating direction and rotation speed detected by said detection means and the operational phase detected by said phase detector, for calculating a value of inertia for each tape reel, second calculation means responsive to the operational phase detected by said phase detector, for calculating the acceleration of drawing-out or taking up of the tape, and control means responsive to the calculated inertia, the operational phase, and the calculated acceleration for controlling said loading motor to control loading and unloading of the tape.

4. A tape loading device for a magnetic recording/playback apparatus, said apparatus adapted for insertion thereinto of a tape cassette containing a magnetic tape, said tape loading device comprising:

tape guides for defining a tape travel path, a tape loading mechanism for controlling said tape guides to move a tape out of a tape cassette which has been inserted into the magnetic recording/playback apparatus, to the tape travel path, and back from the tape travel path into the tape cassette, a loading motor for driving said tape loading mechanism, a phase detector for detecting the operational phase of said tape loading mechanism, a reel motor for applying back tension to the tape, detection means for detecting the rotating direction and the rotation speed of each tape reel of the tape cassette, first calculation means responsive to the values of rotating direction and rotation speed detected by said detection means and the operational phase detected by said phase detector, for calculating an allowable range of values of acceleration of drawing-out or taking up of tape for each tape reel, second calculation means responsive to the operational phase detected by said phase detector, for calculating the acceleration of drawing-out or taking up of the tape, and control means responsive to the calculated acceleration and the calculated allowable range of values of acceleration for controlling said loading motor.

* * * * *